(12) United States Patent
Way et al.

(10) Patent No.: US 6,812,324 B2
(45) Date of Patent: Nov. 2, 2004

(54) METHOD FOR PREPARING NYLON 6 COPOLYMER CONTAINING SULFONATE COMONOMERS

(75) Inventors: Tun-Fun Way, Hsinchu (TW); Cheng Yeh, Hsinchu (TW); Lien-Tai Chen, Hsinchu (TW); Chia-Hung Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/325,857

(22) Filed: Dec. 23, 2002

(65) Prior Publication Data

US 2003/0130478 A1 Jul. 10, 2003

(30) Foreign Application Priority Data

Dec. 26, 2001 (TW) ........................................ 90132423 A

(51) Int. Cl.[7] .............................................. C08G 69/28
(52) U.S. Cl. ........................ 528/337; 528/310; 528/312; 528/322; 528/323; 528/324; 528/332; 528/335; 528/336; 528/340; 528/347; 525/420; 525/432
(58) Field of Search ................................ 528/310, 312, 528/322, 323, 324, 332, 335, 336, 337, 340, 347, 331, 338, 339; 525/420, 432

(56) References Cited

U.S. PATENT DOCUMENTS

| | | | | |
|---|---|---|---|---|
| 3,846,507 A | * | 11/1974 | Thomm et al. | ............. 525/432 |
| 4,083,894 A | * | 4/1978 | Kusunose et al. | .......... 525/437 |
| 5,108,684 A | * | 4/1992 | Anton et al. | .............. 264/176.1 |
| 5,223,196 A | * | 6/1993 | Shridharani et al. | .......... 264/78 |
| 5,290,850 A | * | 3/1994 | Shridharani et al. | ........ 524/607 |
| 5,322,922 A | * | 6/1994 | Berger et al. | ................ 528/337 |
| 5,889,138 A | * | 3/1999 | Summers | ..................... 528/310 |
| 6,277,948 B1 | * | 8/2001 | Zahr | ........................... 528/310 |
| 6,537,475 B1 | * | 3/2003 | Studholme | ............. 264/172.18 |
| 2003/0130478 A1 | * | 7/2003 | Way et al. | .................. 528/310 |
| 2003/0138625 A1 | * | 7/2003 | Studholme | ................... 428/364 |

FOREIGN PATENT DOCUMENTS

JP          2003-238680       * 8/2003

* cited by examiner

Primary Examiner—P. Hampton Hightower
(74) Attorney, Agent, or Firm—Sughrue Mion, PLLC

(57) ABSTRACT

A method for preparing nylon 6 copolymer containing 5-sulfoisophthalate salts comonomer. The method includes the steps of reacting 5-sulfoisophthalate salts ester with aliphatic diamine in a molar ratio of 2~20 at 160~200° C., followed by completely removing the unreacted aliphatic diamine, to obtain the intermediate compound with terminal amine, 5-sulfobenzenediamide compound (formula III). Next, caprolactam and aliphatic diacid (formula IV) are reacted at 200~260° C. to form an oligomer with a low molecular weight. 5-Sulfobenzenediamide (formula III) and catalyst are then added into the oligomer obtained in previous step to cause a polymerization reaction at 200~280° C. to obtain nylon 6 copolymer containing 5-sulfoisophthalate salt comonomer. The molar ratio of E/C is 0.005~0.150 and the molar ratio of D/E is 1.05-1.00. Compounds present in the water extract are greatly reduced.

8 Claims, No Drawings

METHOD FOR PREPARING NYLON 6 COPOLYMER CONTAINING SULFONATE COMONOMERS

BACKGROUND OF THE INVENTION

1. Field of the Invention

The present invention relates to a method for preparing nylon 6 fibers. In particular, the invention involves the preparation of nylon 6 copolymer containing 5-sulfoisophthalate salts.

2. Description of the Prior Art

Nylon fiber is widely used in the manufacture of carpets and other textile materials. In recent years, advancements in the properties and applications of PET are continuously in progress, which is threatening to the nylon market. However, nylon, which exhibits specific characteristics, is still applicable in several areas. Present techniques or further development for the preparation of nylon fibers have placed more emphasis on using specific comonomer and nylon monomers in synthetic reaction to prepare nylon comonomers. Resins or fibers made from the nylon comonomers exhibit good stain resistance to food coloring and soil. Related patens are U.S. Pat. Nos. 5,889,138, 5,108,684 and JP Laid-open Patent No. 03-137221, 01223908, 53-142499 and 53-134896.

Conventional dyes used for nylon 6 are mainly acid dyes. Nylon copolymer modified using the above method can be dyed with cationic dyes, which allows further development of various kinds of new textile, disclosed in U.S. Pat. Nos. 5,484,455, 5,342,417 and 5,199,958.

The primary comonomer of the nylon copolymer is 5-sulfoisophthalate salts (or methylester). The nylon copolymer is prepared by adding 5-sulfoisophthalate salts (or esters) and hexamethylene diamine to the nylon comonomer (caprolactam; CPL) or its oligomer to promote copolymerization.

However, the water extractable compounds of the nylon copolymer obtained using the above method is too high, which causes: (1) large variation in the amount of the comonomer (for example, 5-sulfoisophthalate salts) of the nylon copolymer, which affects the stability of the physical and chemical characteristics of the nylon; (2) large amounts of compounds present in the extract, which increases the difficulty of recycling nylon 6 monomer (CPL), thus creating high production costs.

SUMMARY OF THE INVENTION

In order to overcome the above problems, the invention provides a method for preparing 5-sulfobenzenediamide and a method using the 5-sulfobenzenediamide as an intermediate to prepare nylon 6 copolymer containing sulfonate salts. The intermediate of 5-sulfobenzenediamide with terminal amines is prepared by synthesizing 5-sulfoisophthalate salts and an aliphatic diamine of formula II, preferably 1,6-hexamethylene diamine. Next, caprolactam and an aliphatic diacid, preferably, adipic acid, are reacted to form an nylon 6 oligomer with a low molecular weight. The intermediate 5-Sulfobenzenediamide and catalyst are then added into the nylon 6 oligomer obtained in the previous step to cause a polymerization reaction to obtain nylon 6 copolymer containing 5-sulfoisophthalate salts.

In order to achieve the present invention, there is provided a method for preparing nylon 6 copolymer containing 5-sulfoisophthalate salts comonomers, comprising the steps of:

i. reacting (A) 5-sulfoisophthalate salts ester (formula I)

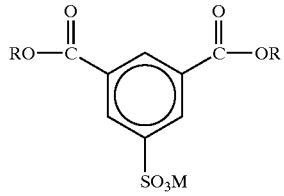

(formula I)

with (B) aliphatic diamine (formula II)

$NH_2(CH_2)_nNH_2$          (formula II)

in a molar ratio of 2~30, followed by completely removing the unreacted aliphatic diamine, to obtain (E) 5-sulfobenzenediamide compound (formula III);

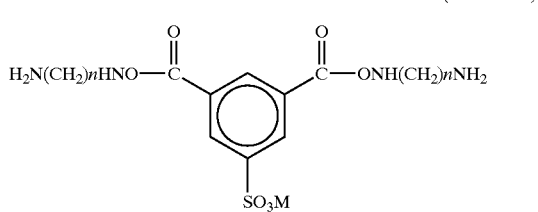

(formula III)

ii. reacting (C) caprolactam with (D) aliphatic diacid (formula IV)

$HOOC(CH_2)_nCOOH$          (formula IV)

at 200~2600° C. to form an oligomer with low molecular weight; and iii. adding (E) 5-sulfobenzenediamide (formula III) and catalyst to the oligomer obtained in step (ii) to cause a polymerization reaction to obtain nylon 6 copolymer containing 5-sulfoisophthalate salts comonomer, wherein the molar ratio of E/C is 0.005~0.150 and the molar ratio of D/E is 1.05~4.00.

In the method provided in the present invention, R is —$(CH_2)_n$H and n is an integer of 1~6 in formula I. In formula II, III and IV, n is an integer of 1~12. In addition, M is Li, Na or K in formula I and III. Suitable catalysts are hypophosphorous acid, acetic acid, alkaline metal and alkaline-earth metal. Preferred amount of the catalyst is 0.9 mole % (relative to caprolactam).

According to the method for preparing nylon 6 copolymer containing 5-sulfoisophthalate salts, the water extractable compounds of the produced nylon 6 copolymer is greatly reduced, thereby improving the stability of the amount of monomer present in the copolymer. Overall stability of the physical and chemical characteristics of nylon is consequently improved. In addition, compounds present in the extract are greatly reduced, and the complexity of recycling nylon 6 monomer (caprolactam) is reduced, thus reducing the production costs.

The present invention will become more fully understood from the detailed description given hereinbelow and the accompanying drawings, given by way of illustration only and thus not intended to be limitative of the present invention.

DETAILED DESCRIPTION OF THE INVENTION PREFERRED EMBODIMENT

EXAMPLE 1

(Step i) Synthesis of Intermediate Compound (Formula III)

0.90 mole of 5-sulfoisophthalic acid monosodium salt dimethylester (5-SSIPDM), 2.7 mole of 1,6-hexamethylene diamine, were added in a 316 SS 2L reactor at room temperature. After mixing completely for 30 minutes, the mixture was heated to 200° C. (the temperature ramp was 1.0° C./min). When the temperature of the reactor reached 200° C., the temperature was maintained for 1.7 hours and the vacuum distillation was turned on to obtain the compound shown as formula III.

$^1$HNMR analysis ($D_2O$+TMS, ppm): 8.27–8.44 (3H, phenyl); 3.30–3.50(4' $NCH_2$); 1.28–2.43(8H ' $4CH_2$); IR($cm^{-1}$) analysis (major adsorption peak):3200;3140;1650.

EXAMPLE 2

(Step ii): Synthesis of Nylon 6 Oligomer 23.20 mole of caprolactam (CPL), 11.11 mole of H2O and 0.45 mole of adipic acid were added in a 316 SS 2L reactor at room temperature. After mixing completely for 30 minutes, the temperature was raised to 180–190° C. (temperature ramp was 0.35° C./min) for 6 hours. Nylon 6 oligomer were obtained.

EXAMPLE 3

(Step iii): Synthesis of Nylon 6 Copolymer Having a Theoretical Amount of 5-sulfoisophthalate Salt 1.9 Mole % (catalyst=1.9 mole %)

0.45 mole of the intermediate compound obtained in Example 1 and 0.22 mole of catalyst hypophosphorous acid was then added to the oligomers obtained in Example 2. When the temperature of the reactor reached 230° C., it remained for 20 hours. The product was then removed from the reactor for cutting into pieces when the mixing torque reached a predetermined value. The final product of nylon 6 copolymer was obtained. RV=2.97 dl/g; $T_m$=209.8° C.; T=287.7° C.; and water extractable amount (Soxhlet Extraction)=7.22 wt %.

EXAMPLE 4

Synthesis of Nylon 6 Copolymer Having a Theoretical Amount of 5-sulfoisophthalate Salt 1.9 mole % (Catalyst=0.9 mole %)

Example 3 was repeated with a reduction in the amount of the catalyst hypophosphorous acid (0.9 mole %). RV of the product was 2.96 dl/g; $T_m$=209.1° C.; $T_d$=320.8° C.; and water extractable amount (Soxhlet Extraction)=5.79 wt %.

COMPARATIVE EXAMPLE

Synthesis of Nylon 6 Copolymer Having a Theoretical Amount of 5-sulfoisophthalate Salt 1.9 Mole % (Catalyst=0.9 mole %)

0.5 mole of 5-sulfoisophthalic acid monosodium salt dimethylester (5-SSIPDM), 0.5 mole of adipic acid (AA), and 1 mole of HMDA (1,6-hexamethylene diamine) were added in a 316 SS 2L reactor at room temperature. After mixing completely for 30 minutes at 100° C., the mixture was heated to 200° C. (the temperature ramp was 0.83° C./min). When the temperature of the reactor reached 200° C., it remained for 2 hours, followed by cooling. The next day, 8.0 mole of CPL, 2.2 mole of $H_2O$ and 0.22 mole of catalyst hypophosphorous acid were added to the reactor. Temperature was raised to 170° C. and the mixture was blended evenly for 30 minutes. The temperature was raised to 200° C. for 15 hours. Then the temperature was raised to 230° C. until the mixing torque reached a predetermined value. The product was removed for cutting into pieces to obtain a final product of nylon 6 copolymer. RV of the product is 2.13 dl/g; $T_m$=188° C.; $T_d$=290.5° C.; and water extractable amount (Soxhlet Extraction)=8.21 wt %.

TABLE 1

| | Catalyst added (mol%) | Relative viscosity (dl/g) | $T_m$ (° C.) | $T_d$ (° C.) | Extractable amount of water (%) |
|---|---|---|---|---|---|
| Example 3 | 1.9 | 2.97 | 209 | 287 | 7.2 |
| Example 4 | 0.9 | 2.96 | 209 | 320 | 5.80 |
| Comparative Example | 0.9 | 2.73 | 198 | 290 | 8.2 |

From Table 1, it is observed that the amount of the extractable water of the nylon 6 copolymer prepared according to the method provided in the present invention is greatly reduced. In particular, in Example 4, it is lower than 6%. Therefore, the amount of monomer present in the copolymer is stabilized to improve the stability of the physical properties of the modified nylon. In addition, the amount of reactant present in the extract shows that the complexity of recycling nylon 6 monomer (caprolactam; CPL) is greatly reduced. Production cost is thus decreased.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for preparing nylon 6 copolymer containing 5-sulfoisophthalate salts comonomer, comprising:

i. Reacting (A) 5-sulfoisophthalate salts ester (formula I)

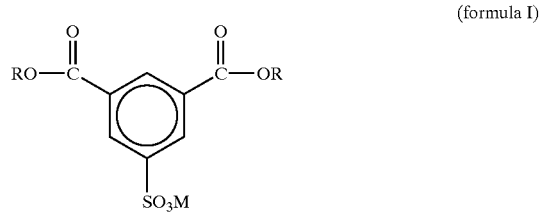

(formula I)

with (B) aliphatic diamine (formula II)

$NH_2(CH_2)_nNH_2$ (formula II)

in a molar ratio of 2~30, followed by completely removing the unreacted aliphatic diamine, to obtain (E) 5-sulfobenzenediamide compound (formula III);

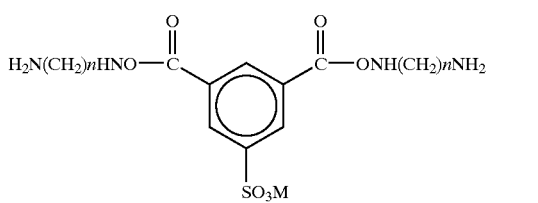
(formula III)

ii. Reacting (C) caprolactam with (D) aliphatic diacid (formula IV)

(formula IV)

to form an oligomer with low molecular weight; and iii. Adding (E) 5-sulfobenzenediamide (formula III) and catalyst to the oligomer obtained in step (ii) to cause a polymerization reaction to obtain nylon 6 copolymer containing 5-sulfoisophthalate salts comonomer, wherein R is —$(CH_2)_nH$ and n is a positive integer of 1~6 in formula I; n is a positive integer of 1~12 in formulas II, III and IV; M is Li, Na or K in formulas I and III; the molar ratio of E/C is 0.005~0.150; and the molar ratio of D/E is 1.05~1.00.

2. The method as claimed in claim 1, wherein the catalyst is hypophosphorous acid, acetic acid, alkaline metal or alkaline-earth metal.

3. The method as claimed in claim 1, wherein the amount of the catalyst is 0.5~3.0 mole % relative to the amount of caprolactam.

4. The method as claimed in claim 1, wherein the reaction temperature of step (i) is 160~200° C.

5. The method as claimed in claim 1, wherein the reaction temperature of step (ii) is 200~260° C.

6. The method as claimed in claim 5, wherein the reaction temperature of step (iii) is 200~280° C.

7. The method as claimed in claim 1, wherein the aliphatic diamine of formula II is 1,6-hexamethylene diamine.

8. The method as claimed in claim 1, wherein the aliphatic diacid of formula IV is adipic acid.

* * * * *